United States Patent
Amler et al.

(10) Patent No.: US 12,265,568 B2
(45) Date of Patent: Apr. 1, 2025

(54) OBJECT-BASED TEXT SEARCHING USING GROUP SCORE EXPRESSIONS

(71) Applicant: SAP SE, Walldorf (DE)

(72) Inventors: Andreas Amler, Heidelberg (DE); Joerg Fellmann, Nussloch (DE); Till Merker, Sandhausen (DE); Oliver Horn, Nussloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/358,796

(22) Filed: Jul. 25, 2023

(65) Prior Publication Data
US 2025/0036672 A1    Jan. 30, 2025

(51) Int. Cl.
| G06F 7/00 | (2006.01) |
| G06F 16/00 | (2019.01) |
| G06F 16/334 | (2025.01) |
| G06F 16/335 | (2019.01) |

(52) U.S. Cl.
CPC ........ G06F 16/3347 (2019.01); G06F 16/335 (2019.01)

(58) Field of Classification Search
None
See application file for complete search history.

(56) References Cited

U.S. PATENT DOCUMENTS

| 8,484,208 B1 * | 7/2013 | Raghavan | G06F 16/248 |
| | | | 707/728 |
| 2015/0081682 A1 * | 3/2015 | Frydl | G06F 16/951 |
| | | | 707/723 |
| 2016/0125320 A1 * | 5/2016 | Metzger | G06F 16/951 |
| | | | 705/5 |

* cited by examiner

*Primary Examiner* — Tuan A Pham
(74) *Attorney, Agent, or Firm* — Mintz, Levin, Cohn, Ferris, Glovsky and Popeo, P.C.

(57) ABSTRACT

Methods and systems for object-based text searching using group score expressions are provided. A method may include receiving a query including a request to search specified columns of a table for a set of search terms, and a group score filter for use in filtering the table based at least on a group score associated with a plurality of groups of rows of the table, determining the group score for each of a plurality of groups of rows of the table, filtering the table based at least on the group score filter included in the query and the group score determined for each of the plurality of groups of rows of the table, and providing at least one group of rows of the plurality of groups of rows that includes at least the portion of the set of search terms.

20 Claims, 4 Drawing Sheets

200

| id 202 | A 204 | B 206 |
|---|---|---|
| 1 | 'search' | |
| 1 | | 'terms' |
| 2 | | 'search' |

210

| id 202 | Group score 208 |
|---|---|
| 1 | 1.0 |
| 2 | 0.29 |

OBJECT-BASED TEXT SEARCHING USING GROUP SCORE EXPRESSIONS

TECHNICAL FIELD

The subject matter described herein relates generally to query processing and more specifically to object-based text searching using group score expressions.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like. Queries, such as SQL queries, may include full text searches based on search terms included in the queries.

SUMMARY

Systems, methods, and articles of manufacture, including computer program products, are provided for object-based text searching using group score expressions. In one aspect, there is provided a system. The system may include at least one data processor and at least one memory. The at least one memory may store instructions that result in operations when executed by the at least one data processor. The operations may include: receiving a query including: a request to search specified columns of a table for a set of search terms, and a group score filter for use in filtering the table based at least on a group score associated with a plurality of groups of rows of the table. The group score for a group of rows of the plurality of groups of rows indicates a strength of a match between the set of search terms and at least a portion of the set of search terms found in the group of rows across the columns specified by the request. The operations may also include determining the group score for each of the plurality of groups of rows of the table. The operations may also include filtering the table based at least on the group score filter included in the query and the group score determined for each of the plurality of groups of rows of the table. The operations may also include providing, in response to the query and based at least on the filtering, at least one group of rows of the plurality of groups of rows that includes at least the portion of the set of search terms.

A computer-implemented method may include: receiving a query including: a request to search specified columns of a table for a set of search terms, and a group score filter for use in filtering the table based at least on a group score associated with a plurality of groups of rows of the table. The group score for a group of rows of the plurality of groups of rows indicates a strength of a match between the set of search terms and at least a portion of the set of search terms found in the group of rows across the columns specified by the request. The method may also include determining the group score for each of the plurality of groups of rows of the table. The method may also include filtering the table based at least on the group score filter included in the query and the group score determined for each of the plurality of groups of rows of the table. The method may also include providing, in response to the query and based at least on the filtering, at least one group of rows of the plurality of groups of rows that includes at least the portion of the set of search terms.

A non-transitory computer-readable medium storing instructions, which when executed by at least one data processor, result in operations including: receiving a query including: a request to search specified columns of a table for a set of search terms, and a group score filter for use in filtering the table based at least on a group score associated with a plurality of groups of rows of the table. The group score for a group of rows of the plurality of groups of rows indicates a strength of a match between the set of search terms and at least a portion of the set of search terms found in the group of rows across the columns specified by the request. The operations may also include determining the group score for each of the plurality of groups of rows of the table. The operations may also include filtering the table based at least on the group score filter included in the query and the group score determined for each of the plurality of groups of rows of the table. The operations may also include providing, in response to the query and based at least on the filtering, at least one group of rows of the plurality of groups of rows that includes at least the portion of the set of search terms.

In some variations of the methods, systems, and non-transitory computer readable media, one or more of the following features can optionally be included in any feasible combination. In some variations, determining the group score for each of the plurality of groups of rows further includes: determining a vector of partial scores for each field of a first group of rows of the plurality of groups of rows that includes at least the portion of the set of search terms. The vector of partial scores contains a first partial score corresponding to a first variant of the set of search terms and a second partial score corresponding to a second variant of the set of search terms. The determining also includes for the first group of rows, determining an aggregated partial score vector for each specified column of the table by at least aggregating the vector of partial scores across the rows of the first group of rows within each specified column of the table. The determining also includes aggregating the aggregated partial score vector determined for each specified column within the first group of rows.

In some variations, aggregating the vector of partial scores across the rows of the first group of rows includes: comparing the first partial score of a first vector of partial scores of a first field in a first column and in a first row of the first group of rows to the first partial score of a second vector of partial scores of a second field in the first column and in a second row of the first group of rows. Aggregating the vector of partial scores across the rows of the first group of rows also includes: including the first partial score of the first vector for inclusion in the aggregated partial score vector when the first partial score of the first vector is greater than the first partial score of the second vector.

In some variations, the aggregating of the aggregated partial score vector is at least one of a total, an average, a difference, a maximum, and a weighted average of the aggregated partial score vector determined for each specified column within the first group of rows.

In some variations, rows of each group of rows of the plurality of groups of rows share a group identifier that is common to the rows.

In some variations, the method and/or operations further include sorting the table based at least on the group identifier associated with each row of the table.

In some variations, the method and/or operations further include scanning the specified columns of the table within each group of rows of the plurality of groups of rows for at least the portion of the set of search terms.

In some variations, the group score filter is at least one of a threshold group score and a maximum group score. When the group score filter is the threshold group score, the at least one group of rows is provided in response to the query if the group score for the at least one group of rows meets the threshold group score. When the group score filter is the maximum group score, the at least one group of rows is provided in response to the query if the group score for the at least one group of rows is the maximum group score relative to group scores for other groups of rows of the plurality of groups of rows.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Database management systems and operations performed on the data managed by a database management system have become increasingly complex. For example, a database management system (or database for short) can support relatively complex online analytical processing (OLAP, which can perform multi-dimensional analysis) to more straightforward transaction based online transaction processing (OLTP). Moreover, the database may be configured as a row-store database or column-store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query optimizer to determine an efficient way to execute the query plan.

Database management systems (including, for example, in-memory databases management systems and distributed database systems) can be used to store and manage a large amount of data. Full text searches of database management systems generally involve searching for a set of search terms in multiple rows and/or columns from the same table or from multiple tables as part of a join query.

In some instances, the set of search terms can be found across multiple related rows of the table. Thus, in response to the search, a record is generally considered to be found if the set of search terms appears across some combination of the related rows. However, conventional searching techniques are unable to adequately search the related rows for the set of search terms. Searching can also be inefficient and/or require a large amount of computing resources to complete, especially in scenarios that involve searching a large number of rows. Further, conventional score expressions can be used to return search results based on a score assigned to the results based on how well the results match the search terms. However, such conventional scoring techniques can be inefficient and require a large amount of computing resources since it can be difficult for conventional systems to generate a score when the set of search terms is contained across a group of rows.

The database management system consistent with example embodiments of the current subject matter may efficiently handle queries involving object-based full text searches by, for example, using group score expressions. Objects may include documents, products, business units, portions thereof, and/or the like. Object-based full text searches involve searching for an object that contains a set of search terms. This may involve searching groups of rows for the set of search terms, where the groups of rows are related to the specified object.

Using group score expressions, the database management system described herein may efficiently handle queries by searching groups of rows (e.g., related rows) for the set of search terms. In doing so, the database management system can determine at least one group of rows that contains the set of search terms or contains at least a portion of the set of search terms. For example, the database management system may determine a group score for each of the groups of rows in a table, such as groups of rows that contain at least a portion (e.g., a word, a phrase, a part of a word, and/or the like) of the set of search terms, and provide a response to the query based on the group score. In some embodiments, the database management system described herein may determine partial scores for each field of each group of rows and aggregate the partial scores to determine the group scores for use in returning the search results, increasing processing speeds and query processing efficiency, while reducing computing resources required for executing a query, such as before or during execution of a query execution plan.

As an example, the system may receive a query including a request to search specified columns of a table for a set of search terms. The query may also include a group score filter for use in filtering the table based at least on a group score associated with a plurality of groups of rows of the table. The group score for a group of rows of the plurality of groups of rows indicates a strength of a match between the set of search terms and at least a portion of the set of search terms (e.g., the whole set of search terms, a first word or phrase of the set of search terms, a second word or phrase of the set of search terms, a portion of a word or phrase of the set of search terms, etc.) found in the group of rows across the specified columns of the table. The system may determine the group score for each of the plurality of groups of rows of the table, filter the table based at least on the group score filter included in the query and the group score determined for each of the plurality of groups of rows of the table, and provide at least one group of rows of the plurality of groups of rows that includes at least the portion of the set of search terms in response to the query and based at least on the filtering. Accordingly, the described systems and methods provide a simple and efficient process for handling object-based full text searches using group score expressions.

Figure 4:
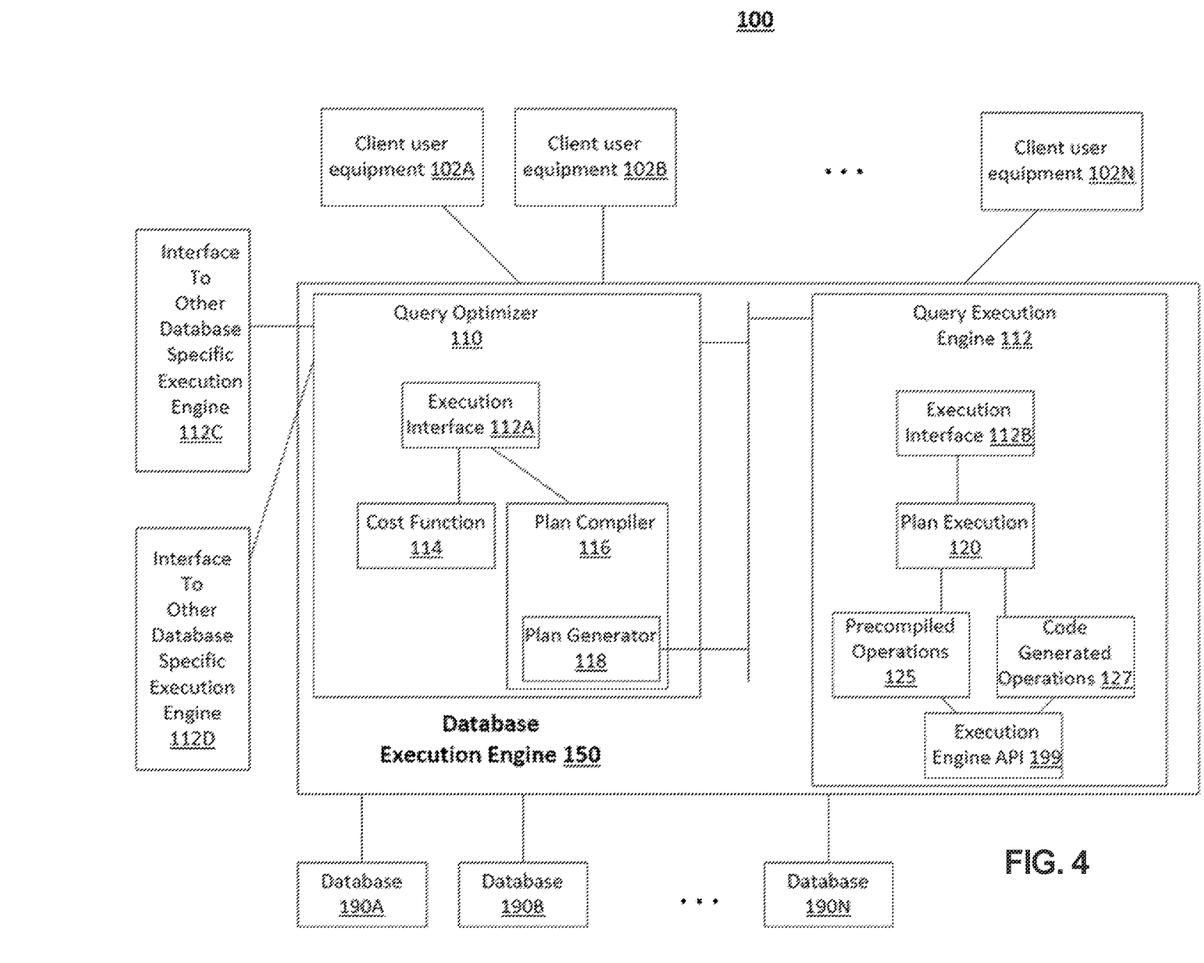
FIG. 4 depicts a block diagram for a database management system, in accordance with some example embodiments.

According to some embodiments, a database management system 100 may include an execution engine 150 that may be configured to receive a query, generate a query plan (including for example query algebra), optimize the query plan, and/or generate executable code, as discussed herein, and discussed in more detail with respect to FIG. 4. Referring to FIG. 4, the database management system 100 may include databases 190A-N. The execution engine 150 may communicate with the databases 190A-N to store and retrieve a plurality of rows for use in executing a query, such as a query including an object-based full text search. As used herein, an "object" may include documents, products, business units, data sources, portions thereof, and/or the like. Object-based full text searches involve searching for an object that contains a set of search terms. This may involve searching groups of rows for the set of search terms, where the groups of rows are related to the specified object. Further, as used herein, a "full text search" refers to a search for a set of search terms, a search term, or search phrase (collectively referred to herein as a "set of search terms") based on one or more predicates included in the query.

The query may include a request to search specified columns (e.g., one column, two columns, three columns, etc.) of a table for a set of search terms. In some embodiments, the query also includes a request to group the rows of the table. The execution engine 150 searches groups of rows across the specified columns for the set of search terms (rather than each individual row for the set of search terms). The query may be executed during execution of a query plan, such as by the execution engine 150. The table may be a single table or may be a joined table that is a join of one or more other tables.

The table may include a plurality of groups of rows. Each of the groups of rows may be associated with an object. In some embodiments, rows of each group of rows share a common group identifier (e.g., a group identifier common to the rows), which can be included in a column of the table. The group identifier may be numeric, alphanumeric, alphabetical, and/or the like. The group identifier may be associated with a particular object (e.g., a document, a product, a data source, and/or the like). The rows of the table can be sorted based at least on the group identifier associated with each row of the table such that the rows with group identifiers are grouped together within the table. Additionally and/or alternatively, the rows of the table can be hashed based at least on the group identifier associated with each row of the table such that the rows with group identifiers are grouped together within the table. In some embodiments, the query includes an operator that causes the table to be grouped, sorted, and/or hashed based on the group identifiers associated with each row. As an example, the rows of the table can be sorted based on the type of object, document, product, data source, and/or the like, such that rows associated with a particular type of object, document, product, data source, and/or the like, are grouped together.

The request included in the query may be a request for one or more groups of rows that contain at least a portion of the set of search terms. Additionally and/or alternatively, the request included in the query may be a request for an object that contains at least a portion of the set of search terms.

In some embodiments, the query also includes a group score filter (e.g., a group score filter predicate) that is used to determine which object(s) or group(s) of rows to provide in response to the query. In other words, the group score filter may be used to filter the table based at least a group score determined by the database management system 100 for each of the plurality of groups of rows of the table meeting or failing to meet group score criteria set by the group score filter. In some embodiments, the query does not include a group score filter. In such embodiments, the group score determined for each group of rows can be used to filter, sort, or project the group of rows.

The group score for a particular group of rows of the plurality of groups of rows indicates a strength of a match between the set of search terms and at least a portion of the set of search terms found in the group of rows across the specified columns of the table. For example, a group of rows containing a larger portion (or all) of the set of search terms may be assigned a higher group score than a group of rows containing a smaller portion of the set of search terms, and vice versa. As another example, a group of rows containing a particular portion (e.g., a first word or phrase in the set of search terms, a higher quantity of letters in the set of search terms, etc.) of the set of search terms or the set of search terms in a particular order may be assigned a higher group score than a group of rows containing a different portion (e.g., a second word or phrase in the set of search terms, a lower quantity of letters in the set of search terms, etc.) of the search term or in a different order, and vice versa. Thus, the execution engine 150 may execute the query according to the group score filter (when the group score filter is included in the query), and execution of the query would return one or more groups of rows or objects associated with the one or more groups of rows that comply with the group score filter or would not return any groups of rows or objects when those groups of rows or objects do not comply with the group score filter. In embodiments in which the query does not include the group score filter, the execution engine 150 may use the group score determined for each group of rows to filter, sort, and/or project the groups of rows.

The group score filter may be a threshold group score (e.g., predefined threshold score), a maximum group score, a minimum group score, a rank score, and/or the like. The maximum group score filter returns an object or group of rows associated with the object from the search results that has a maximum associated group score relative to the group scores determined for the other groups of rows in the table. The minimum score filter returns an object or group of rows associated with the object from the search results that has a minimum associated group score relative to the group scores determined for the other groups of rows in the table. The threshold group score filter returns at least one object or at least one group of rows associated with the at least one object from the search results that have a determined group score (e.g., a value between or equal to 0.0 and 1.0) that meets the threshold score (e.g., is greater than or equal to the threshold score or is less than or equal to the threshold score depending on the particular filter included in the query). The rank score filter returns objects or groups of rows associated with the objects from the search results in ascending or descending order of the associated group score.

The results returned in response to execution of the query may include one or more groups of rows that contain at least a portion of the set of search terms. Additionally and/or alternatively, the results returned in response to execution of the query may include one or more objects associated with the one or more group of rows. The returned one or more objects and/or one or more groups of rows returned in response to the query have a group score that meets the group score filter provided in the query. For example, in some embodiments, an object and/or a group of rows containing the exact set of search terms may be returned in response to the query. In other embodiments, an object and/or a group of rows containing a portion of the set of search terms that satisfies the group score criteria set by the group score filter may be returned in response to the query.

Figure 1:
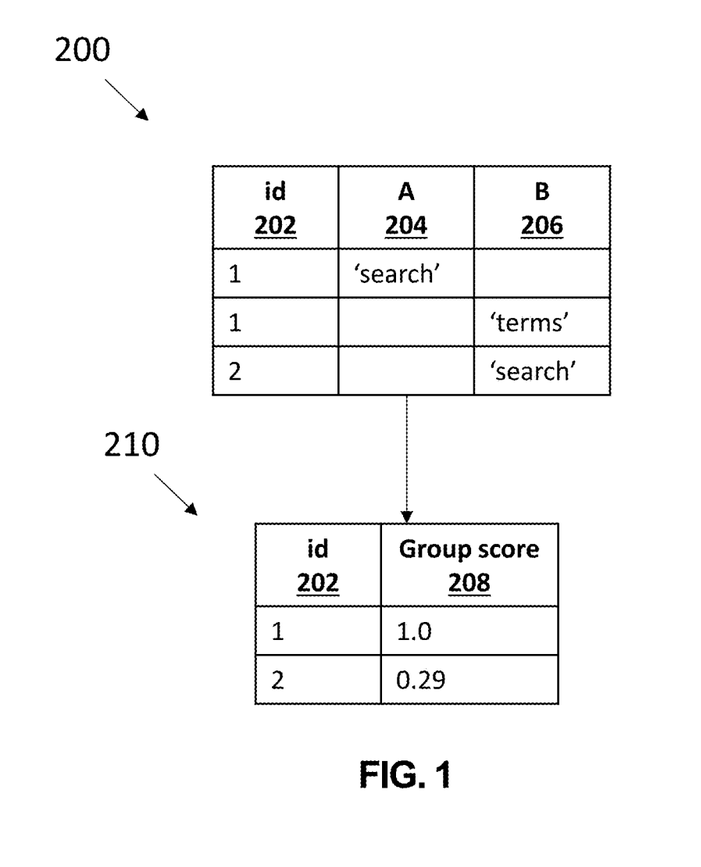
FIG. 1 depicts a diagram illustrating execution of text searching using group score expressions, in accordance with some example embodiments.

FIG. 1 depicts execution of an example query using group score expressions, in accordance with some example embodiments. To illustrate, an example query is shown below:

SELECT ID, GROUP_SCORE ('search terms' IN (A,B)) FROM T
GROUP BY ID HAVING GROUP_SCORE ('search terms' IN (A,B))>0.5

Alternatively, the example query can be written as:
WITH MY_REQUEST AS (
    SELECT ID, GROUP_SCORE ('search terms' IN (A,B)) AS GS FROM T GROUP BY ID
)
SELECT * FROM MY_REQUEST WHERE GS >0.5

In the above example query, the query includes a request to search specified columns (e.g., column A and column B, shown as columns 204 and 206, respectively, in FIG. 1) of a table (e.g., table T) 200 (see FIG. 1) for a set of search terms (e.g., "search terms"). Further, the query specifies that the rows of the table 200 should be sorted, grouped, and/or hashed based at least on a group identifier ("ID"). In this example, the group identifier ID is shown in column 202 of table 200 of FIG. 1, and indicates the object associated with each row or group of rows. As shown in FIG. 1, the table 200 includes two groups of rows-a first group of rows having the group identifier "1" and a second group of rows having the group identifier "2." In this example, the first group of rows has two rows and the second group of rows has a single row.

Again referring to the above example query, the query includes a group score filter ("GROUP_SCORE >0.5"), which in this case is a threshold group score. This means that the execution engine 150 will return at least one group of rows or the object associated with each of the at least one group of rows that has a determined group score that is greater than 0.5. As another example, if the group score filter was "GROUP_SCORE >0", the execution engine 150 would return any group of rows or the object associated with those groups of rows that contains any portion of the set of search terms. In some embodiments, none of the groups of rows have a group score that complies with the group score filter (e.g., the scores of the groups of rows are all less than 0.5). In such embodiments, the execution engine 150 would not return any group of rows or objects in response to the query. This indicates that none of the groups of rows contained a sufficient portion of the set of search terms. In some embodiments, the query does not include a group score filter. In such embodiments, the group score determined for each group of rows can be used to filter, sort, or project the group of rows.

To execute the query (e.g., during or after execution of a query plan), the execution engine 150 scans column 204 and column 206 within each group of rows (e.g., the first group and the second group) for "search terms." In doing so, the execution engine 150 may scan each field of each row and/or column within each group of rows for at least a portion of "search terms" in sequence or in parallel. Referring to the example table 200, a field in the first column of the first group of rows contains the term "search" and a field in the second column of the first group of rows includes the term "terms." Again referring to the example table 200, only a field in the second column of the first row of the second group of rows contains the term "search."

The database management system 100 determines the group score for each of the groups (e.g., the first group and the second group) of rows of the table 200. Consistent with embodiments of the current subject matter, the group score for a particular group of rows indicates a strength of a match between the set of search terms and at least a portion of the set of search terms found in the group of rows across the specified columns of the table. Referring to FIG. 1, table 210 includes a group score 208 for each of the first group of rows and the second group of rows (delineated by the group identifier 202 shown in the first column of table 210). As shown in the table 210, the execution engine 150 determined the group score of the first group of rows to be 1.0 because the first group of rows contains the entire set of the search terms "search terms" and in the correct order. Further, the execution engine 150 determined the group score of the second group of rows to be 0.29 because the second group of rows contains only a portion of the set of search terms ("search"). Determination of the group score is explained in greater detail with respect to an example depicted in FIG. 2.

The execution engine 150 may filter the table 200 based at least on the group score filter (e.g., the threshold score filter). Thus, the execution engine 150 may remove groups of rows that does not meet the threshold score filter. In this example, the execution engine 150 determined the group score of the second group of rows to be 0.29. Based at least on a comparison between the determined group score and the threshold group score of the group score filter, the execution engine 150 removes or ignores the second group of rows. In response to the query, the execution engine 150 provides the object associated with the group identifier "1" and/or the rows of the first group of rows of the table 200, since the execution engine 150 determines that the group score of 1.0 for the first group of rows meets the threshold group score of the group score filter.

Figure 2:
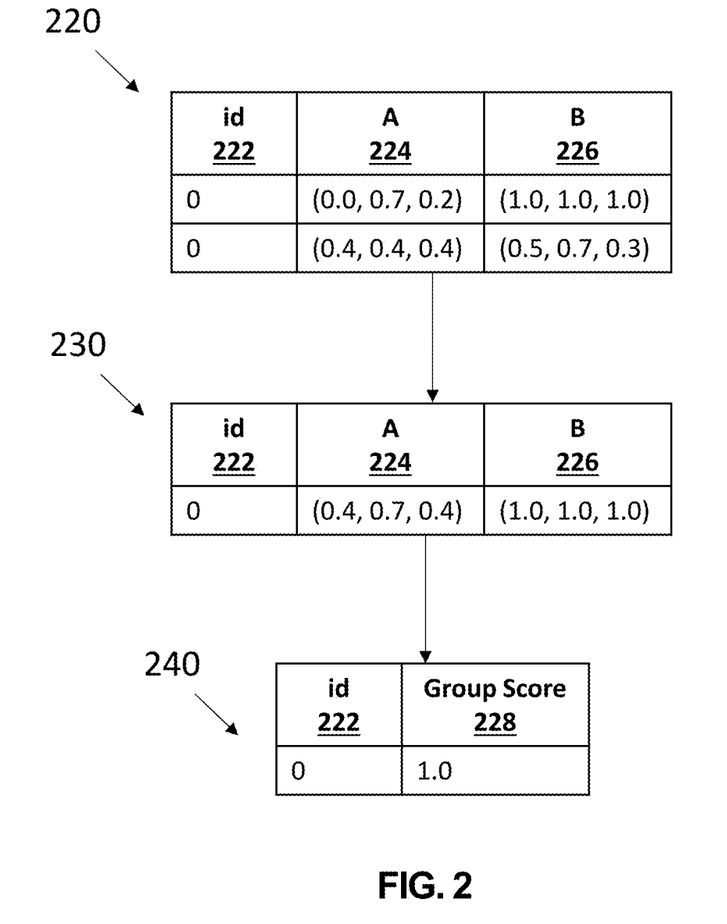
FIG. 2 depicts a diagram illustrating execution of text searching using group score expressions, in accordance with some example embodiments.

FIG. 2 depicts an example of determining a group score for a group of rows and across a first column 224 and a second column 226 specified by an example query, in accordance with some example embodiments. In the example, shown in FIG. 2, each row of the group of rows has a group identifier 222 shown as "0" in the first column of tables 220, 230, 240, indicating that each of the rows is associated with a common object. Consistent with embodiments of the current subject matter, the group score for the group of rows may be determined by determining variants (e.g., portions) of the set of search terms, determining a vector of partial scores for each field of the group of rows based on the variants of the set of search terms, aggregating the vectors of partial scores across the rows of the group of rows, and/or aggregating the vectors of partial scores across the columns of the group of rows.

The execution engine 150 may determine the variants (e.g., portions) of the set of search terms. The variants of the set of search terms may include a first variant, a second variant, a third variant, or so on. Each of the variants may correspond to a particular word or combination of words of the set of search terms. Additionally and/or alternatively, each of the variants may correspond to a portion of a word or combination of words of the set of search terms.

As an example and with reference to FIG. 2, the set of search terms may be "search terms." The execution engine 150 may determine that this set of search terms can be broken into three variants: (1) "search" as a first variant; (2) "terms" as a second variant; and (3) "search terms" as a third variant. For each field in the group of rows, the execution engine 150 may determine a partial score, a vector of partial scores, and/or the like. The partial score (e.g., score, vector, etc.) determined for each field may correspond to the variant contained within the field. For example, a field of the group of rows containing a larger portion (or all) of the set of search terms may be assigned (e.g., by the execution engine 150) a higher partial score than a field of the group of rows containing a smaller portion of the set of search terms or not including any portion of the set of search terms, and vice versa. As another example, a field containing a particular variant (e.g., a first word or phrase in the set of search terms, a higher quantity of letters in the set of search terms, etc.) may be assigned a higher partial score than a field containing a different variant (e.g., a second word or phrase in the search term, a lower quantity of letters in the search term, etc.) of the set of search terms, and vice versa.

Referring to FIG. 2, each field of the table 220 includes a vector of partial scores. The vector of partial scores includes partial scores corresponding to each of the three variants noted above. For example, the vector of partial scores includes a first partial score corresponding to "search," a second partial score corresponding to "terms," and a third partial score corresponding to "search terms." As one example, the first field of the first row in the second column 226 has a determined partial score vector of "(1.0, 1.0, 1.0)." This means that the field in the table contains the entire set of search terms "search terms." As another example, the first field in the first column 224 has a determined partial score vector of "(0.0, 0.7, 0.2)". In this example, the field in the table contains only the term "terms," which is one of the variants of the set of search terms.

Based at least on the partial score vectors for each of the fields in the group of rows, the execution engine 150 may aggregate the partial score vectors for each column specified in the query and across the rows of the group of rows. In other words, the execution engine 150 may determine an aggregated partial score vector for each specified column of the table by at least aggregating the vector of partial scores across the rows of the first group of rows within each specified column of the table. In FIG. 2, table 230 shows an example table including aggregated partial score vectors in the first column 224 and the second column 226. The aggregated partial score vector in the first column 224 is the aggregate of the partial score vectors across the rows (e.g., the first and second rows) of the group of rows within the first column 224 and the aggregated partial score vector in the second column 226 is the aggregate of the partial score vectors across the rows (e.g., the first and second rows) of the group of rows within the second column 226.

To determine the aggregated partial score vector for each column, the execution engine 150 may compare the first partial score of the partial score vector in each of the rows in the corresponding column, the second partial score of the partial score vector in each of the rows in the corresponding column, the third partial score of the partial score vector in each of the rows of the corresponding column, and so on. In some embodiments, the execution engine 150 includes the first partial score of one of the compared partial score vectors as the first partial score of the aggregated partial score vector for the column when the first partial score is the maximum between the compared partial scores, the execution engine 150 includes the second partial score of one of the compared partial score vectors as the second partial score of the aggregated partial score vector for the column when the second partial score is the maximum between the compared partial scores, and so on. In other embodiments, the execution engine 150 determines the partial scores of the aggregated partial score vector for the column as an average of the corresponding partial scores from the rows of the group of rows, a weighted average of the corresponding partial scores from the rows of the group of rows, and/or the like.

Referring to the example shown in FIG. 2, table 230 shows the aggregated partial scores (e.g., partial score vectors) determined for the first column 224 and the second column 226 within the group of rows. In the first column 224, the aggregated partial score vector is (0.4, 0.7, 0.4). Here, the execution engine 150 compared the first partial score (e.g., 0.0) of the partial score vector from the first row in the first column 224 to the first partial score (e.g., 0.4) of the partial score vector from the second row in the first column 224. The execution engine 150 selected the first partial score (e.g., 0.4) of the partial score vector from the second row for inclusion as the first partial score in the aggregated partial score vector in the first column 224 shown in table 230 because the first partial score (e.g., 0.4) of the partial score vector from the second row is greater than the first partial score (e.g., 0.0) of the partial score vector from the first row. The execution engine 150 iteratively repeats this process for each of the partial scores in the partial score vectors in each field.

Further, the execution engine 150 aggregates the aggregated partial score vector determined for each column (e.g., the first column 224 and the second column 226) within the group of rows. Referring to FIG. 2, the table 240 shows the group score in column 228. The group score for the group of rows may be a numeric value between or equal to 0.0 and 1.0. The group score is the aggregate of the aggregated partial score vectors, for the group of rows.

Referring to the above example, the execution engine 150 aggregates the aggregated partial score vector of the first column 224 and the aggregated partial score vector of the second column 226 to determine the group score for the group. In some embodiments, the aggregating of the aggregated partial score vectors is at least one of a total, an average, a difference, a maximum, and a weighted average of the aggregated partial score vectors determined for the first column 224 and the second column 226. The execution engine 150 repeats the process of determining the group score for each of the groups of rows identified by the execution engine 150. The execution engine 150 determines the group score for each of the groups of rows in sequence, in parallel, and/or the like. The execution engine 150 may determine the group score for each of the groups of rows during the scan of the table and/or after the scan of the table.

Figure 3:
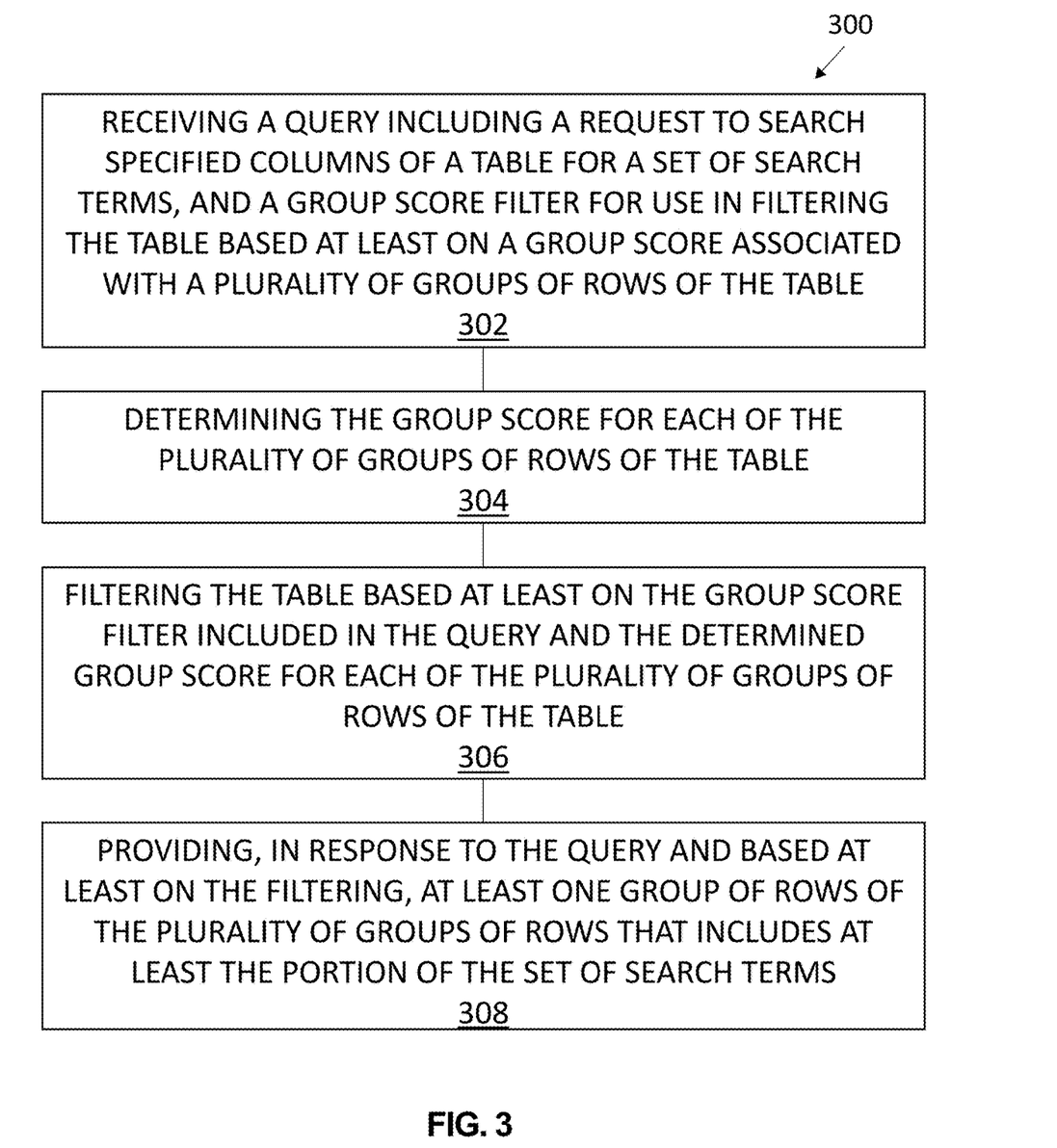
FIG. 3 depicts an example flowchart illustrating a process for executing a query, in accordance with some example embodiments.

FIG. 3 depicts an example flowchart illustrating a process 300 for executing a query, in accordance with some example embodiments. Referring to FIGS. 1-3, one or more aspects of the process 300 may be performed by the execution engine 150 and/or another component of the database management system 100. As described herein, the database management system 100 helps to efficiently execute a query, such as when the query includes a search for a term within a group of rows in a table and/or when the query includes a group score filter.

At 302, the database management system 100 receives a query. The query may include a request to search specified columns (e.g., a first column, a second column, etc.) of a table for a set of search terms. The query may be executed during execution of a query plan, such as by the execution engine 150. The table may be a single table or may be a joined table that is a join of one or more other tables.

The query may additionally include a group score filter for use in filtering the table based at least on a group score associated with a plurality of groups of rows of the table. In other embodiments, the query may not include the group score filter. In such embodiments, the group score determined for each group of rows can be used to filter, sort, or project the group of rows.

The group score for a particular group of rows of the plurality of groups of rows indicates a strength of a match between the set of search terms and at least a portion of the set of search terms found in the group of rows across the columns of the table specified by the request. The group score filter may be an expression in the query. Thus, the execution engine 150 may execute the query according to the group score filter, and execution of the query would return one or more groups of rows that comply with the group score filter. Alternatively, execution of the query would not return any groups of rows when none of the groups of rows comply with the group score filter.

The group score filter can be a threshold group score, a maximum group score, a minimum group score, and/or the like. The threshold group score can be a predetermined threshold. As an example, when the group score filter is the threshold group score, the execution engine 150 provides at least one group of rows in response to the query if the group score for the at least one group of rows meets (e.g., is greater than or equal to) the threshold group score. As another example, when the group score filter is the maximum group score, the execution engine 150 provides at least one group of rows in response to the query if the group score for the at least one group of rows is the maximum group score relative to group scores for other groups of rows of the plurality of groups of rows.

In some embodiments, rows of each group of rows of the plurality of groups of rows share a group identifier (e.g., a common group identifier common to the rows). The group identifier can be associated with a particular object, a document, a product, a data source, and/or the like. The rows of the table can be sorted based at least on the group identifier associated with each row of the table such that the rows with group identifiers are grouped together within the table. As an example, the rows of the table can be sorted based on the type of object, document, product, data source, and/or the like, such that rows associated with a particular type of object, document, product, data source, and/or the like are grouped together.

The database management system 100 (e.g., execution engine 150) may scan the columns (e.g., the columns referenced in the query) specified by the request within each group of rows of the plurality of groups of rows for at least a portion (e.g., any portion or variant, such as a single word or phrase, a part of a word or phrase, the entire word or phrase, etc.) of the set of search terms. The database management system 100 (e.g., execution engine 150) may scan each field of each row and/or column within each group of rows. Each field can be scanned in sequence and/or in parallel.

At 304, the database management system 100 determines the group score for each of the plurality of groups of rows of the table. As noted, the group score for each of the plurality of groups of rows of the table can be used to filter, sort, and/or project the table for responding to the query.

As an example, the database management system 100 may determine a group score for a first group of rows. While the example described references the first group of rows, the database management system 100 may determine the group score for a second group of rows, a third group of rows, and so on, in a similar manner. The database management system 100 may determine a vector of partial scores for each field in a first group of rows of the plurality of groups of rows that includes at least the portion of the set of search terms. The vector of partial scores contains a first partial score corresponding to a first variant of the set of search terms, a second partial score corresponding to a second variant of the set of search terms, and so on, for each variant.

For the first group of rows, the database management system 100 may determine an aggregated partial score vector for each specified column of the table by at least aggregating the vector of partial scores across the rows of the first group of rows within each specified column of the table. As an example, a first field in a first column and in a first row of the first group of rows can include a first vector of partial scores containing partial scores corresponding to variants of the set of search terms, a second field in the first column and in a second row of the first group of rows can include a second vector of partial scores containing partial scores corresponding to the variants of the set of search terms, and so on. Similarly, a third field in a second column and in the first row of the first group of rows can include a third vector of partial scores containing partial scores corresponding to variants of the set of search terms, a fourth field in the second column and in the second row of the first group of rows can include a fourth vector of partial scores containing partial scores corresponding to the variants of the set of search terms, and so on.

The database management system 100 may compare the first partial score of the first vector of partial scores of the first field in the first column and in the first row of the first group of rows to the first partial score of the second vector of partial scores of the second field in the first column and in the second row of the first group of rows. Additionally, the database management system 100 may compare the first partial score of the third vector of partial scores of the third field in the second column and in the first row of the first group of rows to the first partial score of the fourth vector of partial scores of the fourth field in the second column and in the second row of the first group of rows. The database management system 100 may include the first partial score of the first vector in the aggregated partial score vector of the first column when the first partial score of the first vector is greater than the first partial score of the second vector, and vice versa. The database management system 100 may include the first partial score of the third vector in the aggregated partial score vector of the second column when the first partial score of the third vector is greater than the first partial score of the fourth vector, and vice versa.

In some embodiments, the database management system 100 aggregates the aggregated partial score vector determined for each specified column within the first group of rows. The aggregate of the aggregated partial score vectors is the group score for the group (e.g., the first group of rows). Referring to the above example, the database management system 100 aggregates the aggregated partial score vector of the first column and the aggregated partial score vector of the second column to determine the group score for the group. In some embodiments, the aggregating of the aggregated partial score vectors is at least one of a total, an average, a difference, a maximum, and a weighted average of the aggregated partial score vectors determined for each specified column within the first group of rows.

At 306, the database management system 100 filters the table based at least on the group score filter included in the query and the determined group score for each of the plurality of groups of rows of the table. As noted, the group score filter can be a threshold group score, a maximum group score, a minimum group score, and/or the like. When the group score filter is the threshold group score, the execution engine 150 filters the table by at least removing groups of rows that have a group score that fails to meet (e.g., is less than or equal to) the threshold group score. Additionally and/or alternatively, when the group score filter is the threshold group score, the execution engine 150 filters the table by at least providing only groups of rows that have a group score that meets (e.g., is greater than or equal to) the threshold group score. As another example, when the group score filter is the maximum group score, the execution engine 150 filters the table by selecting a group of rows in response to the query if the group score for the group of rows is the maximum group score relative to group scores for other groups of rows of the plurality of groups of rows. Additionally and/or alternatively, when the group score filter is the maximum group score, the execution engine 150 filters the table by removing groups of rows from the table if the group score for those groups of rows does not have the maximum group score relative to group scores for other groups of rows of the plurality of groups of rows. In some embodiments, the query does not include a group score filter. In such embodiments, the group score determined for each group of rows can be used to filter, sort, or project the group of rows.

At 308, in response to the query and based at least on the filtering, the database management system 100 may provide at least one group of rows of the plurality of groups of rows that includes at least the portion of the set of search terms. The at least one group of rows may be provided for executing the query and/or for further processing and/or execution of the query plan.

As noted, in some embodiments, the database management system 100 provides one or more groups of rows that have a group score meeting the group score threshold included in the query. In some embodiments, when the group score filter is the maximum group score, the database management system 100 provides one or more groups of rows that have the maximum group score.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory result in operations comprising: receiving a query including: a request to search specified columns of a table for a set of search terms, and a group score filter for use in filtering the table based at least on a group score associated with a plurality of groups of rows of the table, wherein the group score for a group of rows of the plurality of groups of rows indicates a strength of a match between the set of search terms and at least a portion of the set of search terms found in the group of rows across the columns specified by the request; determining the group score for each of the plurality of groups of rows of the table; filtering the table based at least on the group score filter included in the query and the group score determined for each of the plurality of groups of rows of the table; and providing, in response to the query and based at least on the filtering, at least one group of rows of the plurality of groups of rows that includes at least the portion of the set of search terms.

Example 2: The system of Example 1, wherein determining the group score for each of the plurality of groups of rows further comprises: determining a vector of partial scores for each field of a first group of rows of the plurality of groups of rows that includes at least the portion of the set of search terms, wherein the vector of partial scores contains a first partial score corresponding to a first variant of the set of search terms and a second partial score corresponding to a second variant of the set of search terms; for the first group of rows, determining an aggregated partial score vector for each specified column of the table by at least aggregating the vector of partial scores across the rows of the first group of rows within each specified column of the table; and aggregating the aggregated partial score vector determined for each specified column within the first group of rows.

Example 3: The system of any one of Examples 1 to 2, wherein aggregating the vector of partial scores across the rows of the first group of rows includes: comparing the first partial score of a first vector of partial scores of a first field in a first column and in a first row of the first group of rows to the first partial score of a second vector of partial scores of a second field in the first column and in a second row of the first group of rows; and including the first partial score of the first vector for inclusion in the aggregated partial score vector when the first partial score of the first vector is greater than the first partial score of the second vector.

Example 4: The system of any one of Examples 1 to 3, wherein the aggregating of the aggregated partial score vector is at least one of a total, an average, a difference, a maximum, and a weighted average of the aggregated partial score vector determined for each specified column within the first group of rows.

Example 5: The system of any one of Examples 1 to 4, wherein rows of each group of rows of the plurality of groups of rows share a group identifier that is common to the rows.

Example 6: The system of any one of Examples 1 to 5, wherein the operations further comprise sorting the table based at least on the group identifier associated with each row of the table.

Example 7: The system of any one of Examples 1 to 6, wherein the operations further comprise scanning the specified columns of the table within each group of rows of the plurality of groups of rows for at least the portion of the set of search terms.

Example 8: The system of any one of Examples 1 to 7, wherein the group score filter is at least one of a threshold group score and a maximum group score, wherein when the group score filter is the threshold group score, the at least one group of rows is provided in response to the query if the group score for the at least one group of rows meets the threshold group score, and wherein when the group score filter is the maximum group score, the at least one group of rows is provided in response to the query if the group score for the at least one group of rows is the maximum group score relative to group scores for other groups of rows of the plurality of groups of rows.

Example 9: A computer-implemented method, comprising: receiving a query including: a request to search specified columns of a table for a set of search terms, and a group score filter for use in filtering the table based at least on a group score associated with a plurality of groups of rows of the table, wherein the group score for a group of rows of the plurality of groups of rows indicates a strength of a match between the set of search terms and at least a portion of the set of search terms found in the group of rows across the columns specified by the request; determining the group score for each of the plurality of groups of rows of the table; filtering the table based at least on the group score filter included in the query and the group score determined for each of the plurality of groups of rows of the table; and providing, in response to the query and based at least on the filtering, at least one group of rows of the plurality of groups of rows that includes at least the portion of the set of search terms.

Example 10: The system of Example 9, wherein determining the group score for each of the plurality of groups of rows further comprises: determining a vector of partial scores for each field of a first group of rows of the plurality of groups of rows that includes at least the portion of the set of search terms, wherein the vector of partial scores contains a first partial score corresponding to a first variant of the set of search terms and a second partial score corresponding to a second variant of the set of search terms; for the first group of rows, determining an aggregated partial score vector for each specified column of the table by at least aggregating the vector of partial scores across the rows of the first group of rows within each specified column of the table; and aggregating the aggregated partial score vector determined for each specified column within the first group of rows.

Example 11: The method of any one of Examples 9 to 10, wherein aggregating the vector of partial scores across the rows of the first group of rows includes: comparing the first partial score of a first vector of partial scores of a first field in a first column and in a first row of the first group of rows to the first partial score of a second vector of partial scores of a second field in the first column and in a second row of the first group of rows; and including the first partial score of the first vector for inclusion in the aggregated partial score vector when the first partial score of the first vector is greater than the first partial score of the second vector.

Example 12: The method of any one of Examples 9 to 11, wherein the aggregating of the aggregated partial score vector is at least one of a total, an average, a difference, a maximum, and a weighted average of the aggregated partial score vector determined for each specified column within the first group of rows.

Example 13: The method of any one of Examples 9 to 12, wherein rows of each group of rows of the plurality of groups of rows share a group identifier that is common to the rows.

Example 14: The method of any one of Examples 9 to 13, further comprising sorting the table based at least on the group identifier associated with each row of the table.

Example 15: The method of any one of Examples 9 to 14, further comprising scanning the specified columns of the table within each group of rows of the plurality of groups of rows for at least the portion of the set of search terms.

Example 16: The method of any one of Examples 9 to 15, wherein the group score filter is at least one of a threshold group score and a maximum group score, wherein when the group score filter is the threshold group score, the at least one group of rows is provided in response to the query if the group score for the at least one group of rows meets the threshold group score, and wherein when the group score filter is the maximum group score, the at least one group of rows is provided in response to the query if the group score for the at least one group of rows is the maximum group score relative to group scores for other groups of rows of the plurality of groups of rows.

Example 17: A non-transitory computer-readable medium storing instructions, which when executed by at least one data processor, result in operations comprising: receiving a query including: a request to search specified columns of a table for a set of search terms, and a group score filter for use in filtering the table based at least on a group score associated with a plurality of groups of rows of the table, wherein the group score for a group of rows of the plurality of groups of rows indicates a strength of a match between the set of search terms and at least a portion of the set of search terms found in the group of rows across the columns specified by the request; determining the group score for each of the plurality of groups of rows of the table; filtering the table based at least on the group score filter included in the query and the group score determined for each of the plurality of groups of rows of the table; and providing, in response to the query and based at least on the filtering, at least one group of rows of the plurality of groups of rows that includes at least the portion of the set of search terms.

Example 18: The non-transitory computer-readable medium of Example 17, wherein determining the group score for each of the plurality of groups of rows further comprises: determining a vector of partial scores for each field of a first group of rows of the plurality of groups of rows that includes at least the portion of the set of search terms, wherein the vector of partial scores contains a first partial score corresponding to a first variant of the set of search terms and a second partial score corresponding to a second variant of the set of search terms; for the first group of rows, determining an aggregated partial score vector for each specified column of the table by at least aggregating the vector of partial scores across the rows of the first group of rows within each specified column of the table; and aggregating the aggregated partial score vector determined for each specified column within the first group of rows.

Example 19: The non-transitory computer-readable medium of any one of Examples 17 to 18, wherein aggregating the vector of partial scores across the rows of the first group of rows includes: comparing the first partial score of a first vector of partial scores of a first field in a first column and in a first row of the first group of rows to the first partial score of a second vector of partial scores of a second field in the first column and in a second row of the first group of rows; and including the first partial score of the first vector for inclusion in the aggregated partial score vector when the first partial score of the first vector is greater than the first partial score of the second vector.

Example 20: The non-transitory computer-readable medium of any one of Examples 17 to 19, wherein the aggregating of the aggregated partial score vector is at least one of a total, an average, a difference, a maximum, and a weighted average of the aggregated partial score vector determined for each specified column within the first group of rows.

FIG. 4 depicts an example of a database management system 100, in accordance with some example implementations. The database management system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 4, the databases 190A-N represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via the execution engine 150 to the database layer 190A-N, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system, comprising:
   at least one data processor; and
   at least one memory result in operations comprising:
      receiving a query including:
         a request to search specified columns of a table for a set of search terms, and
         a group score filter for use in filtering, based at least on a group score associated with a plurality of groups of rows of the table, the table, wherein the group score for a group of rows of the plurality of groups of rows indicates a strength of a match between the set of search terms and at least a portion of the set of search terms found in the group of rows across the columns specified by the request;
      determining the group score for each of the plurality of groups of rows of the table, wherein the determining the group score further comprises:
         determining a vector of partial scores for each field of a first group of rows of the plurality of groups of rows, wherein the vector of partial scores includes a first partial score corresponding to a first variant of the set of search terms and a second partial score corresponding to a second variant of the set of search terms,
         for the first group of rows, determining an aggregated partial score vector for each specified column of the table by at least aggregating the vector of partial scores across the rows of the first group of rows within each specified column of the table, and aggregating the aggregated partial score vector determined for each specified column within the first group of rows;

filtering the table based at least on the group score filter included in the query and the group score determined for each of the plurality of groups of rows of the table; and providing, in response to the query and based at least on the filtering, at least one group of rows of the plurality of groups of rows that includes at least the portion of the set of search terms.

2. The system of claim 1, wherein
each field of a first group of rows of the plurality of groups of rows includes at least the portion of the set of search terms.

3. The system of claim 1, wherein aggregating the vector of partial scores across the rows of the first group of rows includes:

comparing the first partial score of a first vector of partial scores of a first field in a first column and in a first row of the first group of rows to the first partial score of a second vector of partial scores of a second field in the first column and in a second row of the first group of rows; and including the first partial score of the first vector for inclusion in the aggregated partial score vector when the first partial score of the first vector is greater than the first partial score of the second vector.

4. The system of claim 1, wherein the aggregating of the aggregated partial score vector is at least one of a total, an average, a difference, a maximum, and a weighted average of the aggregated partial score vector determined for each specified column within the first group of rows.

5. The system of claim 1, wherein rows of each group of rows of the plurality of groups of rows share a group identifier that is common to the rows.

6. The system of claim 5, wherein the operations further comprise sorting the table based at least on the group identifier associated with each row of the table.

7. The system of claim 1, wherein the operations further comprise scanning the specified columns of the table within each group of rows of the plurality of groups of rows for at least the portion of the set of search terms.

8. The system of claim 1, wherein the group score filter is at least one of a threshold group score and a maximum group score, wherein when the group score filter is the threshold group score, the at least one group of rows is provided in response to the query if the group score for the at least one group of rows meets the threshold group score, and wherein when the group score filter is the maximum group score, the at least one group of rows is provided in response to the query if the group score for the at least one group of rows is the maximum group score relative to group scores for other groups of rows of the plurality of groups of rows.

9. A computer-implemented method, comprising:
receiving a query including:
a request to search specified columns of a table for a set of search terms, and
a group score filter for use in filtering the table based at least on a group score associated with a plurality of groups of rows of the table, wherein the group score for a group of rows of the plurality of groups of rows indicates a strength of a match between the set of search terms and at least a portion of the set of search terms found in the group of rows across the columns specified by the request;

determining the group score for each of the plurality of groups of rows of the table, wherein determining the group score for each of the plurality of groups of rows further comprises:

determining a vector of partial scores for each field of a first group of rows of the plurality of groups of rows that includes at least the portion of the set of search terms, wherein the vector of partial scores contains a first partial score corresponding to a first variant of the set of search terms and a second partial score corresponding to a second variant of the set of search terms;

for the first group of rows, determining an aggregated partial score vector for each specified column of the table by at least aggregating the vector of partial scores across the rows of the first group of rows within each specified column of the table; and aggregating the aggregated partial score vector determined for each specified column within the first group of rows;

filtering the table based at least on the group score filter included in the query and the group score determined for each of the plurality of groups of rows of the table; and providing, in response to the query and based at least on the filtering, at least one group of rows of the plurality of groups of rows that includes at least the portion of the set of search terms.

10. The method of claim 9, wherein
each field of a first group of rows of the plurality of groups of rows includes at least the portion of the set of search terms.

11. The method of claim 9, wherein aggregating the vector of partial scores across the rows of the first group of rows includes:

comparing the first partial score of a first vector of partial scores of a first field in a first column and in a first row of the first group of rows to the first partial score of a second vector of partial scores of a second field in the first column and in a second row of the first group of rows; and including the first partial score of the first vector for inclusion in the aggregated partial score vector when the first partial score of the first vector is greater than the first partial score of the second vector.

12. The method of claim 11, wherein the aggregating of the aggregated partial score vector is at least one of a total, an average, a difference, a maximum, and a weighted average of the aggregated partial score vector determined for each specified column within the first group of rows.

13. The method of claim 9, wherein rows of each group of rows of the plurality of groups of rows share a group identifier that is common to the rows.

14. The method of claim 13, further comprising sorting the table based at least on the group identifier associated with each row of the table.

15. The method of claim 9, further comprising scanning the specified columns of the table within each group of rows of the plurality of groups of rows for at least the portion of the set of search terms.

16. The method of claim 9, wherein the group score filter is at least one of a threshold group score and a maximum group score, wherein when the group score filter is the threshold group score, the at least one group of rows is provided in response to the query if the group score for the at least one group of rows meets the threshold group score, and wherein when the group score filter is the maximum group score, the at least one group of rows is provided in response to the query if the group score for the at least one group of rows is the maximum group score relative to group scores for other groups of rows of the plurality of groups of rows.

17. A non-transitory computer-readable medium storing instructions, which when executed by at least one data processor, result in operations comprising:
receiving a query including:
a request to search specified columns of a table for a set of search terms, and
a group score filter for use in filtering the table based at least on a group score associated with a plurality of groups of rows of the table, wherein the group score for a group of rows of the plurality of groups of rows indicates a strength of a match between the set of search terms and at least a portion of the set of search terms found in the group of rows across the columns specified by the request;
determining the group score for each of the plurality of groups of rows of the table, wherein determining the group score for each of the plurality of groups of rows further comprises:
determining a vector of partial scores for each field of a first group of rows of the plurality of groups of rows that includes at least the portion of the set of search terms, wherein the vector of partial scores contains a first partial score corresponding to a first variant of the set of search terms and a second partial score corresponding to a second variant of the set of search terms;
for the first group of rows, determining an aggregated partial score vector for each specified column of the table by at least aggregating the vector of partial scores across the rows of the first group of rows within each specified column of the table; and
aggregating the aggregated partial score vector determined for each specified column within the first group of rows;
filtering the table based at least on the group score filter included in the query and the group score determined for each of the plurality of groups of rows of the table; and
providing, in response to the query and based at least on the filtering, at least one group of rows of the plurality of groups of rows that includes at least the portion of the set of search terms.

18. The non-transitory computer-readable medium of claim 17, wherein
each field of a first group of rows of the plurality of groups of rows includes at least the portion of the set of search terms.

19. The non-transitory computer-readable medium of claim 17, wherein aggregating the vector of partial scores across the rows of the first group of rows includes:
comparing the first partial score of a first vector of partial scores of a first field in a first column and in a first row of the first group of rows to the first partial score of a second vector of partial scores of a second field in the first column and in a second row of the first group of rows; and
including the first partial score of the first vector for inclusion in the aggregated partial score vector when the first partial score of the first vector is greater than the first partial score of the second vector.

20. The non-transitory computer-readable medium of claim 19, wherein the aggregating of the aggregated partial score vector is at least one of a total, an average, a difference, a maximum, and a weighted average of the aggregated partial score vector determined for each specified column within the first group of rows.

* * * * *